United States Patent
Rogers et al.

(10) Patent No.: US 7,500,351 B1
(45) Date of Patent: Mar. 10, 2009

(54) GAS TURBINE POWERPLANT

(75) Inventors: Keith Martin Rogers, Preston (GB); George Mansfield Appleyard, Preston (GB)

(73) Assignee: BAE Systems plc, London (GB)

( * ) Notice: Subject to any disclaimer, the term of this patent is extended or adjusted under 35 U.S.C. 154(b) by 1826 days.

(21) Appl. No.: 08/592,738

(22) Filed: Nov. 29, 1995

(30) Foreign Application Priority Data

Nov. 29, 1994 (GB) .................................. 9424095.9

(51) Int. Cl.
*F02K 3/00* (2006.01)

(52) U.S. Cl. .......................... 60/226.1; 60/263; 60/269; 244/73 R

(58) Field of Classification Search ................ 244/12.3, 244/23 B, 55, 60, 73 R; 60/226.1, 39.15, 60/226.3, 263, 269, 262, 785, 230, 232
See application file for complete search history.

(56) References Cited

U.S. PATENT DOCUMENTS

| | | | | |
|---|---|---|---|---|
| 3,127,129 A | * | 3/1964 | Petrie | 244/23 B |
| 3,318,097 A | * | 5/1967 | Wood et al. | 60/39.15 |
| 3,867,813 A | * | 2/1975 | Leibach | 60/226.1 |
| 4,022,405 A | * | 5/1977 | Peterson | 244/12.3 |
| 4,767,083 A | * | 8/1988 | Koenig et al. | 244/12.3 |
| 5,209,428 A | * | 5/1993 | Bevilaqua et al. | 244/12.3 |
| 5,275,356 A | * | 1/1994 | Bollinger et al. | 244/12.3 |
| 5,312,069 A | * | 5/1994 | Bollinger et al. | 244/12.3 |
| 5,383,332 A | | 1/1995 | Angel | 60/228 |
| 5,407,150 A | * | 4/1995 | Sadleir | 244/23 B |

FOREIGN PATENT DOCUMENTS

| | | | | |
|---|---|---|---|---|
| DE | 2736120 | * | 2/1978 | 244/12.3 |
| GB | 942286 | | 11/1963 | |
| GB | 2254589 | | 10/1992 | |

* cited by examiner

*Primary Examiner*—Timothy D Collins
(74) *Attorney, Agent, or Firm*—Nixon & Vanderhye P.C.

(57) ABSTRACT

A gas turbine powerplant for a V/STOL aircraft in which a vectorable exhaust nozzle at a forward part (eg. nose) of the aircraft selectably receives a supply of cold fan air through a duct leading from the fan through a passageway (28) coaxial with the engine axis and located within the hub of the fan (12), with the aid of controllable flaps and diverters (26, 30).

18 Claims, 1 Drawing Sheet

GAS TURBINE POWERPLANT

FIELD OF THE INVENTION

The present invention relates to gas turbine power plants, and in particular to gas turbine powerplants for use in aircraft of the kind known as vertical or short take-off and landing (V/STOL) aircraft.

BACKGROUND OF THE INVENTION

V/STOL aircraft are well known and commonly employ at least one gas turbine powerplant with one or more vectorable exhaust nozzle(s) which can be directed aft for forward propulsion in wing-borne flight and downwardly for jet-borne flight (hovering) and also in directions and conditions intermediate those mentioned.

One such aircraft has a centrally located powerplant with two fore and two aft vectorable or swivellable lift nozzles mounted directly on the powerplant so as to be symmetrically disposed about the centre of gravity of the aircraft. This has the advantage that the thrusts from the lift nozzles are readily balanced about the centre of gravity and the ducting to the lift nozzles can be made short and therefore efficient.

However, the central location of the powerplant in such aircraft is much further forward than in most other aircraft and imposes severe constraints on aircraft configuration, notably the centre fuselage/wing attachment structure and the undercarriage location and supporting structure. In addition, the forward location of the powerplant reduces the room for the air intake, which is compensated by providing sharp bends with consequent loss of efficiency. Likewise, the jet pipe of the powerplant leading to an outlet nozzle for providing thrust for horizontal flight is lengthened, which is a problem especially in an aircraft incorporating an afterburner for enhanced performance.

In a development of such aircraft, the gas turbine powerplant is located in the more conventional location towards the rear of the aircraft and one or more lift device(s) or nozzle(s) is or are located separately from the main body of the powerplant for supporting the aircraft during jet-borne flight. The supply to the lift devices is provided, on the one hand, by the main exhaust efflux from the powerplant and, on the other, by bleeding off cold low pressure air from the front of the powerplant and leading it through a pipe to a remote lift device. This arrangement is known as a remote lift system (RLS).

The advantage of such an arrangement is the greater freedom in locating the powerplant whilst still permitting thrust balance to be attained for jet-borne flight. However, the designs of RLS which are currently available all involve pipes situated externally of the main body or casing of the gas turbine powerplant for carrying air forward to the remotely situated lift device or devices; such an arrangement has drawbacks in various aspects of the aircraft design in terms of fuselage cross-section, airframe drag, fuel consumption and aircraft mass, at least.

It is also known in gas turbine powerplants to bleed off a small proportion of the low pressure compressor air through the compressor hub for the purposes of pressurizing seals and providing cooling for lubricant oil and turbine blades. Such air is utilised for assisting in compressor efficiency but has no utilisation for lift devices or nozzles.

It is an aim of the present invention to provide a gas turbine powerplant including a supply for one or more lift devices or nozzles which overcomes the various problems described above and combines efficient and effective lifting with a compact powerplant design.

SUMMARY OF THE INVENTION

The gas turbine powerplant of the present invention employs a passage leading from the powerplant to the nose of the aircraft, coaxially with the main axis of the powerplant to supply low pressure compressor air forwards to a remote lift device.

According to one aspect of the present invention, there is provided a gas turbine powerplant for V/STOL aircraft, wherein means are provided for directing a sufficient proportion of the low pressure compressor air forwardly, preferably via a space within the low pressure by-pass fan hub of the powerplant, substantially along or adjacent to the central axis of the compressor to supply air to a remote lift means of the aircraft effective to support the aircraft in jet-borne flight.

The invention has a number of advantages and, in particular, enables a simplified powerplant installation and permits a simpler and more compact aircraft structure around the powerplant by comparison with the known designs featuring large pipes external to the main body of the powerplant. This saves mass and reduces the cross-sectional area of the aircraft thus improving flight performance and fuel consumption and reducing aircraft cost and maintenance.

By providing a passage extending along the axis of the main powerplant, a more direct supply to the remote lift device is possible. This reduces the mass and improves the aerodynamic efficiency of the lift device, and avoids the compromise of both intake duct path and aircraft cross-section which normally results from having duct(s) external to the engine. Even if the diameter of the air intake for the powerplant has to be increased, such increase will not be substantial and will not significantly affect the operation of the powerplant.

In a preferred embodiment of the invention, the gas turbine powerplant further comprises a by-pass fan and a by-pass duct surrounding the housing for the compressor, and the means for directing air forwardly are selectably operable to direct the by-pass air forwardly instead of rearwardly along into the by-pass duct or high-pressure compressor.

The forwardly directed air may be employed during jet-borne flight only for operation of the remote lift device, or alternatively, low pressure gas air may continue to be forwardly directed during wing-borne flight, for example for the supply on an auxiliary powerplant or for operation of a reaction control valve for pitch and/or yaw control of the aircraft at low speed or for supply to any other device requiring flow such as additional nozzles, blown flaps etc.

DESCRIPTION OF THE DRAWINGS

The invention is described further, by way of example only, with reference to the accompanying drawing which is a diagrammatic section through one embodiment of gas turbine powerplant according to the present invention.

DESCRIPTION OF THE PREFERRED EMBODIMENT

Figure 1:
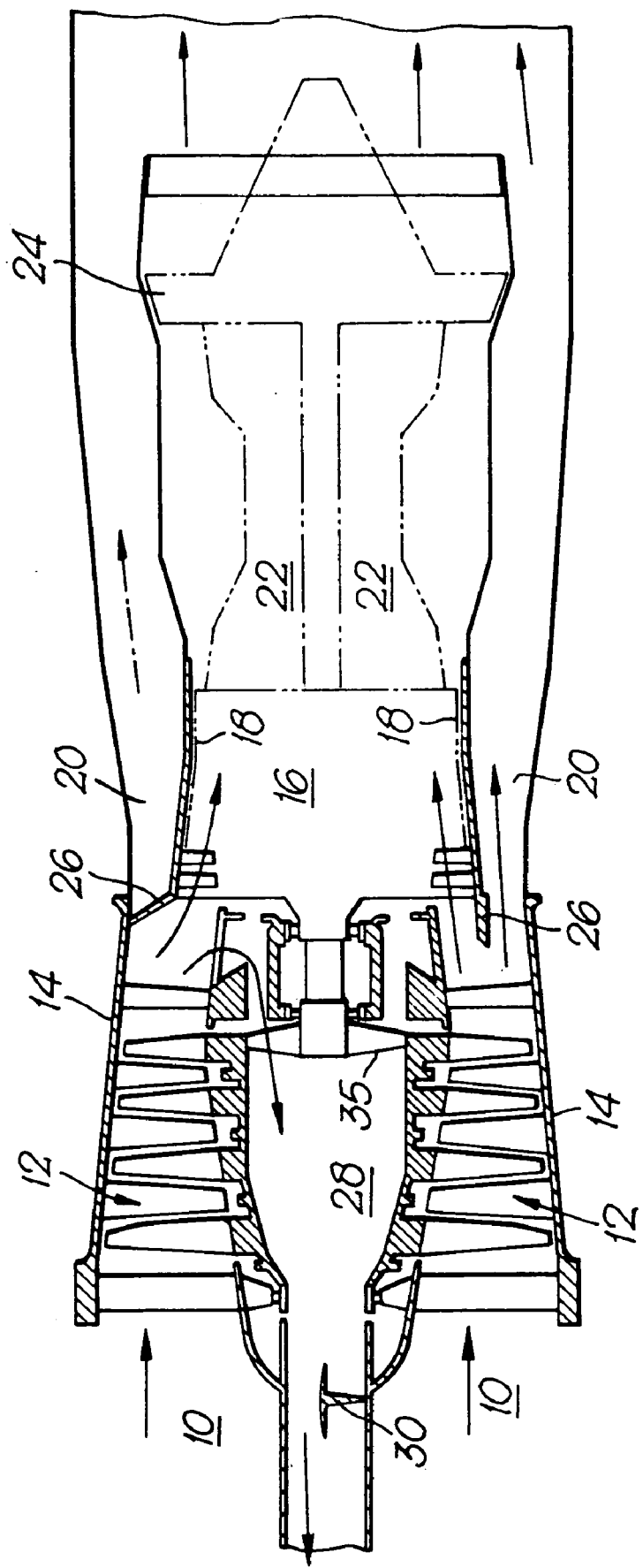

Referring to the drawing (FIG. 1), which is an axial section through a gas turbine powerplant featuring the present invention, the lower half of the drawing illustrates the powerplant in a conventional flight mode for horizontal or wing-borne flight whereas the upper half of the drawing illustrates the powerplant in a remote lift mode for hovering or jet-borne flight. The lower half of the drawing will be described first.

As illustrated, the gas turbine powerplant comprises an air intake 10 supplying a low pressure or by-pass fan 12 within a fan housing 14. Downstream of the low pressure fan 12 is a high pressure compressor 16 in a compressor housing 18. A by-pass duct 20 surrounds the compressor housing 18. A combustion chamber 22 is situated downstream of the compressor for injecting fuel into the compressed air and igniting it, the hot combustion air being then led to a turbine 24, and from there to non-illustrated jet nozzles which may be vectorable nozzles. The by-pass air from duct 20 is directed to a non-illustrated flight nozzle which may also, in wing-borne flight mode, receive the exhaust air from the turbine. An afterburner section may be provided upstream of this flight nozzle. In this mode, a selectively operable diverter flap 26 or other suitable flow control device, located in the by-pass duct 20 at the upstream end of the compressor, is open. The powerplant operates conventionally to provide forward propulsion and need not be described further.

Turning now to the upper half of the drawing, it will be seen that the diverter 26 has been operated to restrict flow of air along duct 20. This has the effect of forcing air compressed by the fan 12 to flow into a forwardly directed passage 28 in the hub of the fan 12, to carry a supply of air forwardly to a remote lift device or vectorable nozzle (not shown). In this mode, the amount of air diverted into the forwardly directed passage 28 may be such a substantial proportion as to enable the remote lift device(s) to operate so as to enable the aircraft carrying the powerplant to sustain vertical or jet-borne flight.

A means to prevent air from flowing forwardly during conventional wing-borne flight mode must be provided. By way of example, the lower half of the drawing shows the provision in the forwardly directed passage 28 of a blocking baffle 30 which is arranged to block the passage 28 and prevent air from flowing forwards during the conventional flight mode. The baffle 30 or other blocking device may be situated at any convenient point along the flow path of the forwardly directed air.

As described with reference to the drawing, the illustrated gas turbine powerplant features a selectably operable arrangement for diverting low pressure compressor air from flowing through the by-pass duct 20 and into the forwardly directed passage 28.

In an alternative embodiment of the invention, low pressure compressor air may be directed forwardly from part-way along the compressor 16 through the compressor hub.

In both instances, the forwardly directed flow takes place along the axis of the gas turbine powerplant, which has significant advantages in terms both of powerplant design and of overall aircraft design.

The passage 28 may include radial support structures for the hub itself or for the front bearing housing of the powerplant, and these may, if desired, be designed to promote efficient flow. For example, such radial support structures may be in the form of static vanes to generate a reaction force or in the form of rotating vanes 35 to do work on the flow, for eliminating swirl in the airflow or increasing the total enthalpy of the diverted air to increase the available thrust at the remote lift device. By increasing the proportion of vertical thrust available at the forward lift device an improved balance between power plant cycles may be achieved in wing-borne (forward flight) and jet-borne (vertical lift) flight modes.

If the vanes 35 are static vanes, they may be designed to have part or all of their chord variable in incidence, so as to either preserve engine matching over the range of conditions encountered, or to control the relation between thrust available from the diverted air, and thrust available from the air which passes through the downstream elements of the engine. This latter may be of particular value in maintaining effective balance and control of the aircraft throughout the jet-borne flight regime, and at the instant of change between forward (wing-borne) flight and vertical lift (jet-borne flight) modes.

We claim:

1. A gas turbine powerplant for V/STOL aircraft comprising:
   a compressor having a central axis,
   a central hub being concentric with said central axis and having a passage therethrough, and
   means for directing forwardly through said passage in said central hub a sufficient proportion of the low pressure compressor air to operate a remote lift means effective in use to support the aircraft in jet-borne flight.

2. A gas turbine powerplant according to claim 1 wherein said passage tapers forwardly.

3. A gas turbine powerplant according to claim 1 further comprising means for directing reasonably through said compressor a remaining proportion of the low pressure compressor air, which is not directed forwardly, for supply to further remote lift means.

4. A gas turbine powerplant according to claim 1 further comprising:
   a low pressure fan having an inlet,
   an outlet and a fan hub,
   a by-pass duct, and an afterburner, and,
   wherein said fan hub comprises said central hub and said means for directing air forwardly are arranged to direct air from said outlet of the low-pressure fan through said hub of said low pressure fan.

5. A gas turbine powerplant according to claim 4 further comprising a diverter selectably operable for restricting air flow in said by-pass duct so as to force a flow of air forwardly through said hub.

6. A gas turbine powerplant according to claim 4 further comprising blocking means selectably operable to restrict the flow of forwardly directed low pressure fan air.

7. A gas turbine powerplant according to claim 1, wherein said means for directing air is operable for jet-borne flight only.

8. A gas turbine powerplant according to claim 1, in which said means for directing air are selectably operable for directing air forwardly for jet-borne flight and rearwardly for wing-borne propulsion.

9. A gas turbine powerplant according to claim 1 in which said means for directing air are arranged to direct air forwardly during both jet-borne and wing-borne propulsion.

10. A gas turbine powerplant according to claim 9 wherein said means for directing air is arranged to supply a forward propulsion means in wing-borne flight.

11. A gas turbine powerplant according to claim 9, wherein said means for directing air during wing-borne flight supplies air for aircraft control facilities including at least one of a reaction control valve for pitch and/or yaw control and blown flaps.

12. A gas turbine powerplant according to claim 1, wherein said passage includes at least one ring of vanes.

13. A gas turbine powerplant according to claim 12 wherein said ring comprises a vane.

14. A gas turbine powerplant according to claim 12 wherein said ring comprises static vanes, each having at least a part of their chord of variable incidence.

15. A V/STOL aircraft comprising a powerplant according to claim 1 and a plurality of lift means including lift nozzles located fore and aft of said powerplant, at least one of said lift nozzles being in air flow communication with said means for directing air.

16. A gas turbine powerplant for V/STOL aircraft, comprising:

a compressor, means for directing forwardly substantially along or adjacent to a central axis of said compressor a sufficient proportion of the low pressure air to operate a remote lift means effective in use to support the aircraft in jet-borne flight, and a low pressure fan having an inlet, an outlet and a hub, a by-pass duct and an afterburner, said means for directing air forwardly being operative to direct air from said outlet through said hub.

17. A gas turbine powerplant according to claim 16 further comprising a diverter selectably operable for restricting air flow in said by-pass duct so as to force a flow of air forwardly through said hub.

18. A gas turbine powerplant according to claim 16 further comprising a blocking means selectably operable to restrict the flow of forwardly directed low pressure fan air.

* * * * *